Nov. 3, 1970

T. O. PAINE, ACTING
ADMINISTRATOR OF THE NATIONAL AERONAUTICS
AND SPACE ADMINISTRATION
PASSIVE CAGING MECHANISM 3,537,672

Filed Feb. 11, 1969

INVENTOR
JERZY GEORGE ZAREMBA

BY
ATTORNEYS

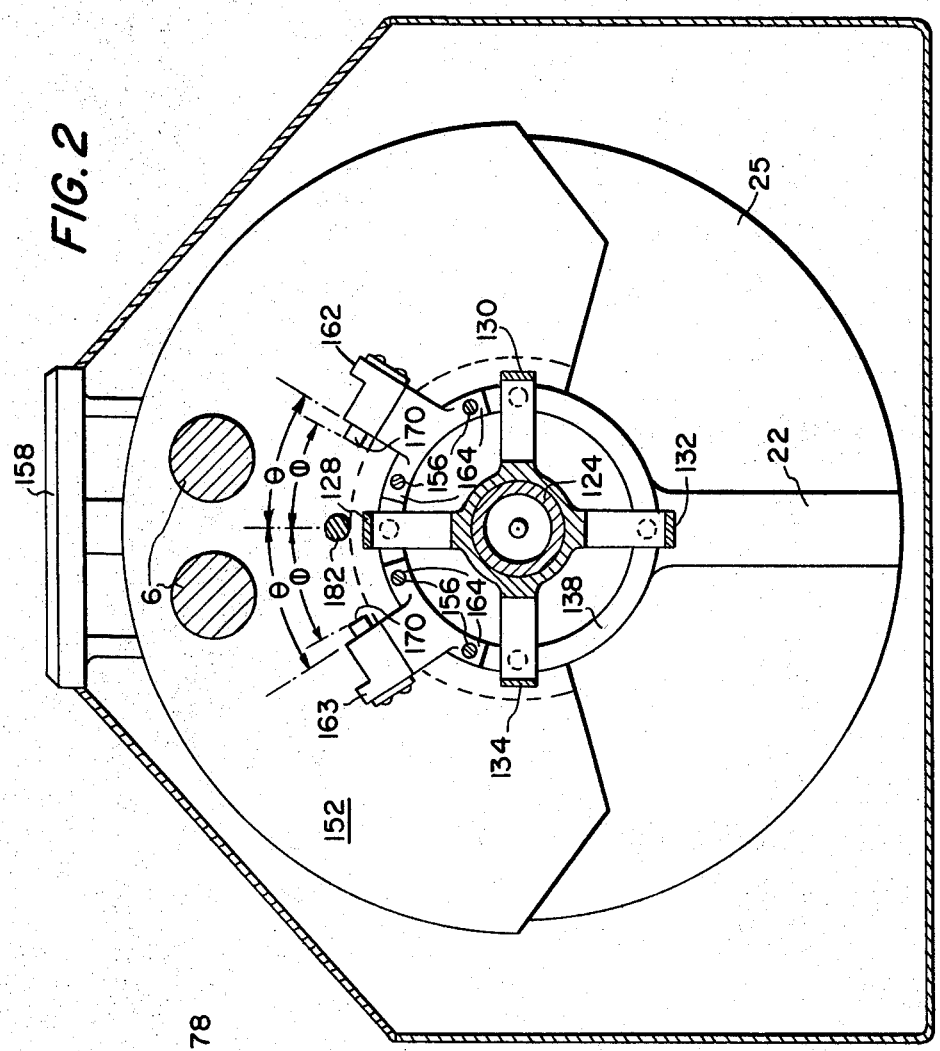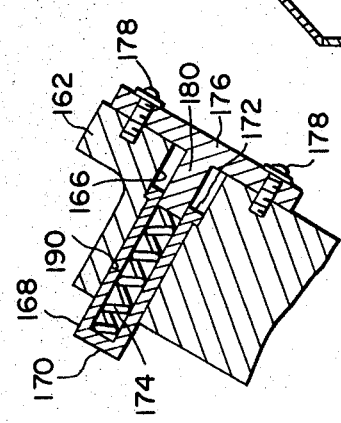

INVENTOR
JERZY GEORGE ZAREMBA
BY
ATTORNEYS

United States Patent Office 3,537,672
Patented Nov. 3, 1970

3,537,672
PASSIVE CAGING MECHANISM
T. O. Paine, Acting Administrator of the National Aeronautics and Space Administration, with respect to an invention of Jerzy George Zaremba, Rolling Hills Estates, Calif.
Filed Feb. 11, 1969, Ser. No. 798,278
Int. Cl. F16f *13/02, 15/00*
U.S. Cl. 248—358                              5 Claims

ABSTRACT OF THE DISCLOSURE

A caging mechanism for protecting the gimbals of a guidance system from vibrations generated during launch of a spacecraft comprising a three stage passive vibration damper including a circumferentially spaced plurality of spring hoops mounted on a sleeve secured to and surrounding a mounting shaft for the gimbals, the spring hoops frictionally engaging the gimbals to damp relatively low amplitude, three-dimensional vibrational movement of the gimbals, the spring hoops being of sufficient stiffness upon compression to damp intermediate amplitude vibrational motion of the gimbals, the shaft mounting said gimbals being impinged upon hard stops for restraining the movement of the gimbals beyond a maximum allowed, relatively large amplitude vibrational movement, the gimbals mounting a pair of circumferentially spaced retractable spring loaded pins providing soft stops for restraining rotation of the gimbals.

---

The invention described herein was made in the performance of work under a NASA contract and is subject to the provisions of Section 305 of the National Aeronautics and Space Act of 1958, Public Law 85–568 (72 Stat. 435; 42 USC 2457).

The present invention relates to a three stage motion restraining mechanism, and more particularly, to a motion restraining mechanism for progressively restraining and damping three dimensional vibrational movement of a gimballed package containing electronics, for example, of a spacecraft guidance system. The invention fulfills a long existing need for isolating spacecraft guidance systems from vibrational movement in response to imbalances associated with launching of the spacecraft. Such guidance systems are of the well-known gimballed type wherein its electronics are retained in a floating gimbal mounted package. More specifically, the gimbals are mounted on a caging mechanism, which is a mounting for the gimbals which operates to damp three dimensional vibrational motion thereof. A requirement of a caging mechanism is that it restrain the gimbals during a launch, yet, subsequent to the launch, operate only as a mounting for the gimbals without introducing restraint thereto. Heretofore, an active caging mechanism has been devised that is deactivated subsequent to launch by an external control signal. A disadvantage of an active caging mechanism is that, upon failure of the external control signal the gimbals remain restrained from movement and, unless redundant deactivation systems are provided the gimballed guidance system will fail to operate subsequent to launch. Accordingly, the invention relates to a completely passive motion restraining and damping caging mechanism for a gimballed package. Additionally, the cooperating components of the present invention coact to restrain in three stages progressive, incremental vibrational motion of the gimbals in each of three directions.

It is therefore an object of the invention to provide a passive caging mechanism mounting the gimbals of a gimballed package.

An additional object of the invention is to provide a passive caging mechanism for restraining in three stages the progressive incremental vibrational motion of a gimbal system in each of three directions.

A further object of the invention is to provide a caging mechanism for restraining vibrational motion of a gimbal system without introducing restraint thereto subsequent to launch of a spacecraft utilizing the gimbal system.

A further object of the invention is to provide a passive caging mechanism including a plurality of springs mounted for movement with a gimbal system and in frictional engagement with a fixed housing in which the gimbal system is mounted to damp relatively low amplitude vibrational motion of the gimbals with respect to said housing.

A further object of the invention is to provide a plurality of springs mounted for motion together with a gimbal system, which springs are compressible between the movable gimbals and a fixed housing containing the gimbals in order to damp intermediate amplitude vibrational motion of the gimbals.

Yet another object of the invention is to provide a plurality of immobile hard stops for impinging against engaging surfaces of a movable gimbal system, thereby restraining relative large amplitude vibrational movement thereof.

Another object of the invention is to provide a passive caging mechanism for a gimbal system wherein the caging mechanism includes cooperating structure coacting to progressively dampen relatively low, intermediate and relatively high amplitude vibrational motions of the gimbal system.

Other objects and many attendant advantages of the present invention will become apparent upon a perusal of the following detailed description, taken together with the accompanying drawings wherein:

FIG. 2 is an enlarged detailed section taken generally along the line 2—2 of FIG. 1;

FIG. 4 is an enlarged fragmentary detailed section of a portion of the structure illustrated in FIG. 2.

Figure 1:
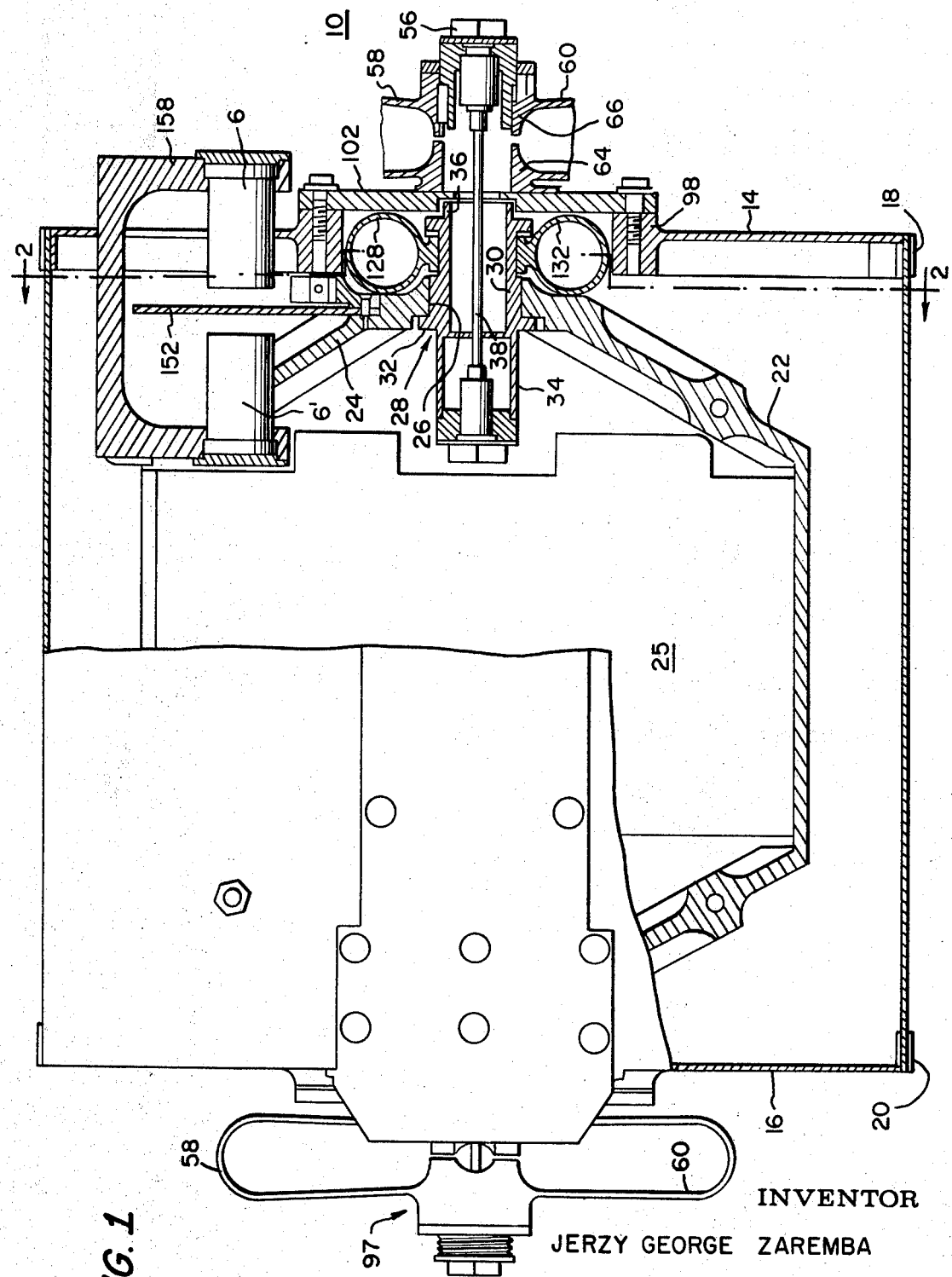
FIG. 1 is an elevation partially broken away and illustrated partially in section in order to show a gimbal system and a passive caging mechanism therefor according to the invention.

With more particular reference to the drawings, illustrated in FIG. 1 is a passive caging mechanism, generally indicated at 10 and including a generally elongated outer peripheral housing sidewall 12 provided with end covers 14 and 16, each of the end covers having a laterally projecting rim 18 and 20, respectively, overlying the edge portions of the housing sidewall 12 and secured thereto in any well-known manner. Enclosed within the housing sidewall 12 and between the spaced end covers 14 and 16 are disposed the well-known spaced arms 22 and 24 of a gimbal system which define therebetween a multisided boundary containing an electronics package, generally indicated at 25 and secured to and supported by the spaced gimbal arms 22 and 24 in any well-known manner. The gimbal arms 22 and 24 are joined adjacent to each of the end covers 14 and 16 and are provided at their intersections with a torsion bar end supporting structure including a cylindrical bore 26 on the arms 22 and 24 which receives a generally cylindrical, laterally disposed hollow shaft 28 having an enlarged diameter central portion 30 received in the bore 26, the portion 30 being flanked by an integral, generally annular locating flange 32 for seating the shaft 28 in position within the bore 26. The enlarged diameter central portion 30 of the shaft 28 is integral with reduced diameter end portions 34 and 36.

Figure 3:
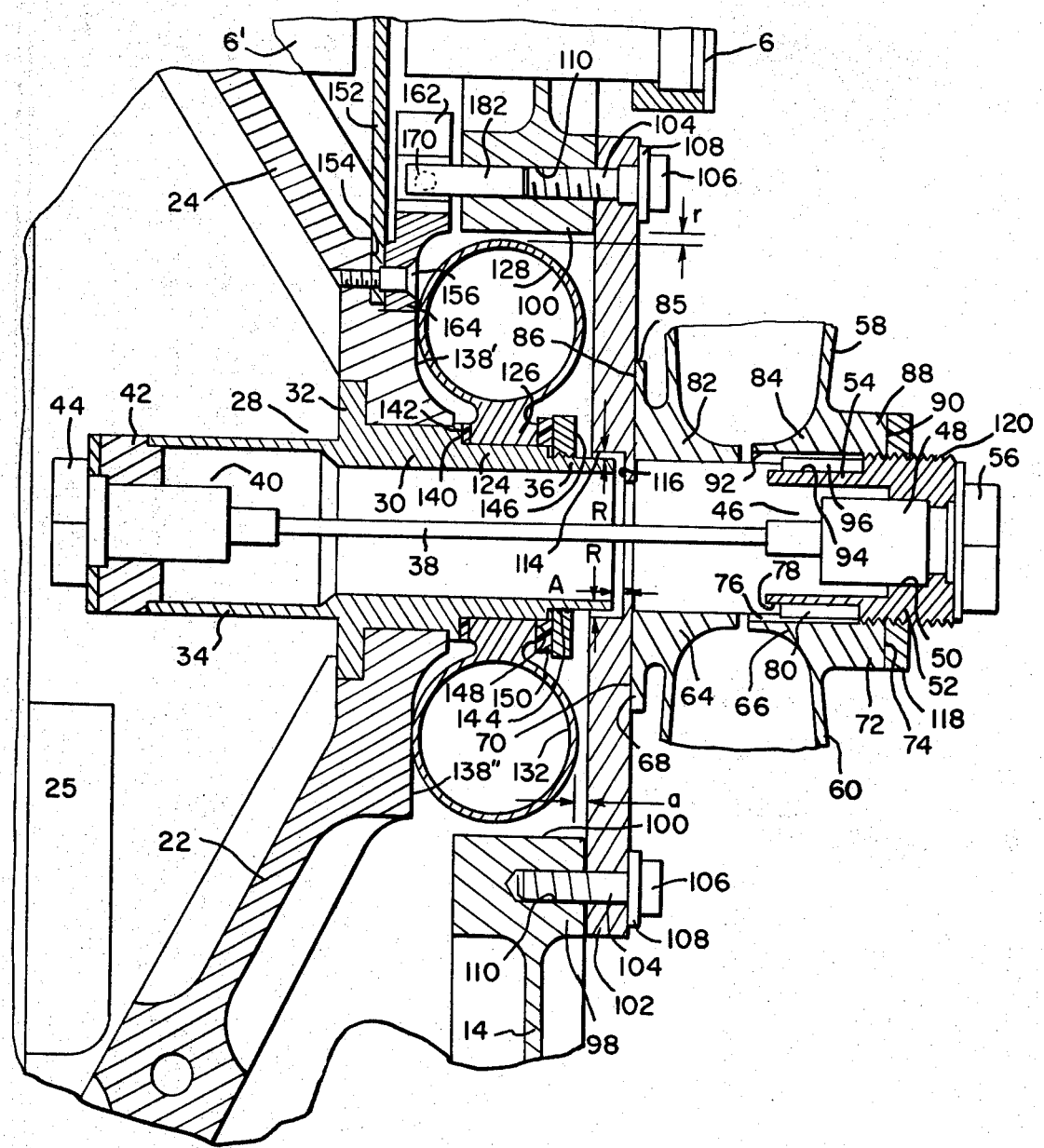
FIG. 3 is an enlarged section of a portion of the passive caging mechanism and gimbal system as illustrated in FIG. 1, indicating with specificity the passive caging mechanism associated therewith.

The hollow shaft 28 surrounds an elongated torsion bar 38, one end of which protrudes from the end portion 36 of the shaft 28. Its other end is affixed to a generally cylindrical end support assembly generally indicated in FIG. 3 at 40. The assembly 40 will not be described in detail since it does not form a part of the invention. However, it should be understood that the end support assembly 40 is secured to the end portion 34 of the shaft 28 by an end plug 42 through which the assembly 40 protrudes, said assembly 40 being secured in place by an enlarged nut 44 threadably secured to the protruding end of the assembly 40. With reference still being made to FIG. 3, taken together with FIG. 1, the opposed end of the torsion bar 38 is retained in an additional end support member 46, the details of which are omitted since they form no part of the invention. It is sufficient that the assembly 46 be described as having an enlarged diameter central portion 48 seated within an annular recess 50 provided in an enlarged cylindrical thickened end wall portion 52 of a generally cylindrical sleeve 54. An enlarged nut 56 is secured to the end of the assembly 46 which protrudes through the end wall portion 52.

With reference again being made to FIGS. 1 and 3, the cylindrical sleeve 54 carries a pair of oppositely extending tension springs 58 and 60, the spring 58 shown partially broken away in FIGS. 1 and 3, the spring 60 shown partially broken away in FIG. 3, for purposes of clarity. As shown in FIG. 1, each of the springs, for example the spring 60, comprises a doubled over-leaf spring having a flange 64 and a flange 66 provided at each of its ends thereof. The flange 64 is provided with a laterally projecting leg portion 68 which is provided with a bearing surface 70. The flanged portion 66 is provided with a protruding extension 72 defining an end bearing surface 74. Additionally, the flanged portion 66 is provided with a keyway 76 immediately adjacent to the outer periphery of the sleeve 54 which is provided with an adjacent keyway 78. The adjacent keyways 76 and 78 slidably receive a locating key 80 which locates the spring 60 in position on the shaft 54 and prevents relative motion therebetween. In similar fashion, the spring 58 is provided at its adjacent ends with flanges 82 and 84, respectively. The flange 82 is provided with a laterally extending leg portion 84 defining a bearing surface 86. The flange 84 is provided with a protruding portion 88 defining an end bearing surface 90. Also, the flange 84 is provided with an inwardly directed, generally inverted keyway 92 immediately adjacent to a keyway 94 provided on the periphery of the sleeve 54. A keyway 96 is received in the adjacent keyways 92 and 94 locating the spring 58 in position on the sleeve 54 and preventing relative motion therebetween. It should be understood that the gimbal arms 22 and 24 intersect also near the other end cover 16 and are provided with similar torsion bar supporting structure generally indicated at 97.

With reference yet to the FIGS. 1 and 3, the end cover 14 is provided centrally thereof with an annular lip 98 having a generally cylindrical sidewall 100 defining an enlarged diameter recess. The lip 98 receives a cover plate 102 thereon which is secured thereto by machine screws 104, the heads 106 of which overlie washers 108. The machine screws 104 are threadably received in threaded bores 110 of the lip 98. The cover plate 102 is provided centrally thereof with a generally annular, inwardly directed recess surrounding the cylindrical end portion 36 of the sleeve 28. The annular recess 114 encircles a portion of the end portion 36 and is spaced circumferentially therefrom by a clearance indicated by the arrows at R. The bottom wall 116 of the recess 114, contiguous with the cylindrical sidewall of the recess 114, is spaced from the end of the sleeve 28 by a clearance indicated by the arrows at A. The bottom wall 116 and the cylindrical sidewall of the recess 114 provide hard stops for the end portion of the sleeve 28. The bearing surface 70 of the laterally extending leg portion 68 provided on the flange 64 of the looped spring 60 impinges against the outwardly directed surface of the cover plate 102. In a similar fashion, the bearing surface 86 provided on the laterally extending flange 85, which is on the flange 82 of the looped spring 58, impinges against the outwardly directed surface of the cover plate 102. The bearing surfaces 74 and 90, provided on the ends of the opposed flanges 66 and 84, respectively, impinge against a tightening ring 118 threadably secured on the sleeve 54 which is externally threaded at 120. By virtue of the flanged portions of the springs 58 and 60 being impinged against the cover plate and the tightening ring 118, the spring action of the looped spring members 58 and 60 is transmitted to preload the torsion rod 38 and seat the end plug 42 on the end portion 34 of the sleeve 28 and seat the flanged portion 32 of the sleeve 28 in the recess provided at the intersection of the gimbal arms 22 and 24. Accordingly, the gimbal arms 22 and 24 are maintained in suspension by the above-described torsion bar mounting means.

With more particular reference being made to FIGS. 1 and 3, together with FIG. 2, the shaft 28 is provided immediately adjacent its central enlarged diameter portion 30 with a reduced diameter cylindrical portion 124 which, as particularly shown in FIG. 2, mounts an encircling sleeve 126 in close fitting relationship thereon. The sleeve 126 is provided with four equally circumferentially spaced, radially projecting, generally annular spring hoops 128, 130, 132 and 134. As more particularly shown in FIG. 3, the spring hoops, such as the hoops 128 and 132, are mounted within the annular space provided by the encircling sidewall 100 which defines the central opening provided in the end cover 14. The spring 128 impinges against a flat bearing sidewall 138' which is provided on the gimbal arm 24. Similarly, the spring 132 impinges against a bearing surface 138" provided on the gimbal arm 22. The sleeve 126, mounting the springs 128 and 132, is provided with an end wall 140 seated upon a shoulder 142 defined between the enlarged diameter central portion 30 of the shaft 28 and the adjacent reduced diameter portion 124 thereof. The end portion 36 of the shaft 28 is adjacent to the reduced diameter portion 124 and is of further reduced diameter and is externally threaded at 144 to threadably receive thereover a threaded tightening ring 146. Impinged between the tightening ring 146 and an end wall 148 of the sleeve 126 is a resilient annulus 150. Upon tightening of the ring 146, the action of the resilient annulus 150 seats the end wall 140 of the sleeve 126 against the shoulder 142 of the sleeve 28. However, relative motion of the ring and the sleeve is permitted to a slight amount. Additionally, the springs 128 and 132 are retained in engagement against the circular bearing surface of the bearing surfaces 138. In a similar fashion, not shown for purposes of clarity, the spring hoops 130 and 134 are similarly mounted upon the sleeve 126 in abutting engagement with bearing surfaces 138.

With the hoop springs mounted as shown in FIG. 3, a radial clearance between the springs and the cylindrical sidewall 100 defining the central opening in the cover plate 14 is indicated in the top portion of FIG. 3 by the arrows designated by $r$. Additionally, a clearance between each of the spring hoops 128 and 132 and the sidewall 100 of the cover plate 102 is indicated by the arrows designated by $a$.

In actual practice, the described clearances may have the following values:

|   | In. |
|---|---|
| $r$ | 0.028 |
| $a$ | 0.008 |
| R | 0.038 |
| A | 0.018 |

The structure of the preferred embodiment of the invention thus far described damps vibrational movement of the gimbal arms in directions both axially and radially of the longitudinal axis of the torsion bar 38. In the axial direction, vibrational oscillations of a relatively low amplitude equal to or less than the dimension of the clearance a will be damped by the friction attributed to the torsion bar 38 and the inertia of combined mass attributed to the gimbal arms 22 and 24 together with the electronics package 25. Damping of intermediate amplitude vibrational motion will be effected by the spring hoops 128–134 impinging against the cover plate 102 upon axial displacement of the gimbal arms a distance equal to or less than the dimension of clearance a. The spring hoops 128–134 will impinge against the cover plate 102, thereby providing a soft stop for terminating the axial displacement of the gimbal arms. Additionally, the spring hoops 128–134 will be deformed to elliptical configurations since they will be compressed between the bearing surfaces 136 and 138 and the cover plate 102. The elliptically deformed spring hoops 128–134 thus will provide an energy absorber and a resilient restoring force which acts to damp intermediate amplitude vibrational motion of the gimbal arms. It should be recognized that the elasticity of the torsion bar 38 and the combined mass of the gimbal arms and electronics package will coact with the deformed spring hoops to damp the intermediate amplitude vibrational movement. In order to damp axial vibrational motion of relatively high amplitude, the gimbal arms 22 and 24 will be displaced, together with the sleeve 28, beyond the soft stops provided by the deformed spring hoops until the end portion 36 of the sleeve 28 abuts against the shoulder 116 provided in the cover plate 102. The shoulder 116 thus will provide a hard stop for damping relatively high amplitude vibrational motion and will act together with the soft stops provided by the deformed spring loops, as well as the elasticity of the torsion bar 38 and the combined inertia of the gimbal arms and the electronics package 25.

In the radial direction, vibrational motion of relatively low amplitude will be damped by the internal and frictional losses arising by way of inertia movement of the gimbal arms and the electronics package.

When intermediate amplitude radial motion is experienced by the gimbal arms, the above-described damping action will occur. Further, the spring hoops will impinge against the sidewall 100 to provide soft stops. The spring hoops will become elliptically deformed as they are compressed against the sidewall 100, thereby increasing their frictional contact with the bearing surface 138. Accordingly, intermediate amplitude vibrational motion will be damped.

When relatively large amplitude motion takes place, the damping action will occur as described. Further, the end portion 36 of the sleeve 28 will impinge against the sidewall 114 of the recess provided in the cover plate 102. Accordingly, radial vibrations beyond an amplitude defined by the clearance R will be prevented.

With attention now being directed to FIGS. 1, 2 and 3 of the drawings, an eddy current damper includes an copper vane 152 secured within a generally arcuate recess 154, provided in the top portion of the circular plate 138' and secured thereto by a plurality of flat head machine screws 156. As thus shown in FIG. 2, the vane 152 is generally circular segmented in configuration and, as best shown in FIG. 1, generally comprises a flat plate mounted perpendicular to the axial length of the torsion bar 38. With reference to FIG. 1, the vane 152 is received by an inverted U-shaped flange 158 carrying in its depending leg portions thereof opposed pairs of generally cylindrical permanent magnets 6 and 6'. The U-shaped flange 158 is affixed to the end cover 14 of the housing 12 in any well-known manner.

With reference to FIGS. 1, 2 and 3, a pair of projecting bosses 162 and 163 are circumferentially mounted on the circular cover plate 138, within the generally arcuate recess 154 thereof and overlying a portion of the vane 152. More specifically, the projecting bosses 162 and 163 are provided with flanged leg portions 164 secured to the cover plate 138 by the machine screws 156. With reference to FIG. 4, a detailed description of the structure associated with each of the bosses 162 and 163 will be described. In the figure, the exemplary boss 162 is shown provided with a bore 190 extending therethrough and terminating in an enlarged diameter recess 166. A generally cylindrical hollow spring retainer 168 is slidably disposed within the bore 164 and is provided with an enclosed end portion 170 and a flanged end portion 172, the flanged portion fitting within the recess 166 and preventing removal of the retainer 168 from the bore 164. Within the hollow retainer 168 is disposed a compressible coil spring 174. The recess 166 is capped by a cover plate 176 attached to the boss 162 by machine screws 178. The cover plate 176 is provided with an inwardly projecting dowel 180 in impingement against an end of the coil spring 174 and freely slidably received by the hollow retainer 168.

With more particular reference being made to FIGS. 2 and 3, a dowel 182 is disposed within the aperture 110 provided in the cover plate 102 as shown best in FIG. 3, the dowel 182 being disposed initially midway between the circumferentially spaced bosses 162 and 163 and, more specifically, midway between the projecting spring retainers 170 of the bosses 162 and 163.

The dowel 182, as shown in FIG. 2, is angularly spaced from each of the retainers 170 by an angle phi and angularly spaced from each of the bosses 162 and 163 by an angle theta. For example, the angle phi may be 25 degrees, and the angle theta 30 degrees.

In actual practice, relatively low amplitude vibrational rotation of the gimbal arms 22 and 24 will be damped by internal and frictional losses arising by way of inertia movement of the gimbal arms and the electronics package 25. Further, the eddy current damping vane 152 will be pivoted between the pairs of magnets 6 and 6' to provide rotation damping in the well-known manner. The spring hoops 128–134 will frictionally slide upon the arcuate bearing surface 136 to provide further damping action.

Upon intermediate vibrational rotation, the abovedescribed damping action will take place. Additionally, the angularly spaced spring retainer ends 170 will impinge against the dowel 182 to provide soft stops.

When relatively large amplitude vibrational rotation of the gimbal arms occurs, the heretofore explained damping action will take place. Further, the spring retainers will be compressed entirely within their respective projecting bosses 162 and 163. The bosses then will stop against the projecting dowel 182 to provide hard stops and prevent vibrational rotation beyond the angle $\theta$.

Accordingly, the invention provides a caging mechanism for damping three dimensional vibrational motion of a gimbal mounted package. A feature of the invention is that the caging mechanism restrains vibrational motion, yet operates only as a mounting for the gimbals without introducing restraint thereto in the absence of vibrational motion thereof.

Other modifications of the invention are apparent, for example, the particular configuration of the housing and cover plate surrounding the spring hoops may be changed without affecting the operation of the caging mechanism. Further, the specific torsion bar structure may be of different configuration, the invention concepts remaining unchanged from that embodied in the appended claims, wherein:

What is claimed is:

1. A passive motion restraining device, comprising: a pair of gimbal arms, a package carried by said gimbal arms, a housing surrounding said gimbal arms, a torsion bar secured to said gimbal arms, mounting means affixing said torsion bar to said housing, said gimbal arms and said package being maintained in suspension within said housing by said torsion bar, and resilient means on said mounting means, said housing surrounding said resilient means and spaced therefrom by a clearance $r$, said housing being spaced from said mounting means by a clearance $R$, said resilient means being engageable and compressible on said housing to provide a soft stop for damping vibrational oscillations in a direction radially of the torsion bar and of amplitudes equal to or greater than the clearance $r$ but less than the clearance $R$, said mounting means being engageable on said housing to provide a hard stop and preventing vibrational oscillations of amplitudes greater than the clearance $R$.

2. The structure as recited in claim 1, wherein: said housing includes a covering portion spaced from said resilient means by a clearance $a$ and spaced from said mounting means by a clearance $A$, said resilient means being engageable and compressible on said covering portion to provide a soft stop for damping vibrational oscillations in a direction axially of the torsion bar and of amplitudes equal to or greater than the clearance $a$ but less than the clearance $A$, said mounting means being engageable on said covering portion to provide a hard stop and preventing vibrational oscillations greater than the clearance $A$.

3. The structure as recited in claim 1, and further including: angularly spaced projecting bosses on said gimbal arms, a projecting stop means on said housing and extending between said bosses, and spring biased retainers projecting from said bosses and being engageable on said stop means to provide soft stops for damping vibrational oscillations of said gimbal arms about the longitudinal axis of the torsion bar, said bosses being engageable on said stop means to provide hard stops for preventing relatively high amplitude vibrational oscillations about the longitudinal axis of the torsion bar.

4. The structure as recited in claim 1, wherein said resilient means are frictionally slidable on said gimbal arms for dissipating vibrational oscillation kinetic energy to heat.

5. The structure as recited in claim 1, wherein said resilient means comprises a plurality of spring hoops deformable to elliptical configurations when compressed against said housing.

References Cited

UNITED STATES PATENTS

| | | | |
|---|---|---|---|
| 3,115,326 | 12/1963 | Barringer | 248—358 |
| 3,145,012 | 8/1964 | Kfoury | 248—358 |
| 3,348,796 | 10/1967 | Barafoff | 248—20 |
| 3,353,632 | 11/1967 | Perhach | 188—1 |

CHANCELLOR E. HARRIS, Primary Examiner

U.S. Cl. X.R.

188—1; 248—20